United States Patent
Bernaden, III et al.

(10) Patent No.: US 6,219,590 B1
(45) Date of Patent: Apr. 17, 2001

(54) STATE MACHINE CONTROLLER FOR OPERATING VARIABLE AIR VOLUME TERMINAL UNITS OF AN ENVIRONMENTAL CONTROL SYSTEM

(75) Inventors: Alex Bernaden, III, Greenfield; Gaylon M. Decious; John E. Seem, both of Shorewood; Kirk H. Drees, Cedarburg; Jonathan D. West, Shorewood; William R. Kuckuk, Hubertus, all of WI (US)

(73) Assignee: Johnson Controls Technology Co., Plymouth, MI (US)

( * ) Notice: Subject to any disclaimer, the term of this patent is extended or adjusted under 35 U.S.C. 154(b) by 0 days.

(21) Appl. No.: 09/054,429

(22) Filed: Apr. 3, 1998

(51) Int. Cl.[7] .................................................. G05B 13/00
(52) U.S. Cl. .......................................... 700/277; 700/300
(58) Field of Search .................................. 700/11–19, 20, 700/21, 270, 277, 278, 279, 299, 300; 165/1; 236/1

(56) References Cited

U.S. PATENT DOCUMENTS

| | | | |
|---|---|---|---|
| 4,897,798 | * | 1/1990 | Cler ...................................... 700/276 |
| 5,311,451 | * | 5/1994 | Barrett ................................. 700/278 |
| 5,491,649 | * | 2/1996 | Friday, Jr. et al. .................. 700/276 |
| 5,537,339 | * | 7/1996 | Naganuma et al. .................. 700/276 |
| 5,555,509 | * | 9/1996 | Dolan et al. .......................... 700/276 |
| 5,581,478 | * | 12/1996 | Cruse et al. ......................... 700/276 |
| 5,790,898 | * | 8/1998 | Kishima et al. ......................... 700/1 |
| 5,791,408 | * | 8/1998 | Seem ................................... 165/250 |
| 5,884,072 | * | 3/1999 | Rasmussen et al. ................. 709/223 |
| 6,006,142 | * | 12/1999 | Seem et al. .......................... 700/276 |

\* cited by examiner

Primary Examiner—William Grant
Assistant Examiner—Chad Rapp
(74) Attorney, Agent, or Firm—Quarles & Brady; George E. Haas

(57) ABSTRACT

The present invention provides a sequencing control strategy for environmental system controllers that takes better advantage of the capabilities of the system elements to enhance performance and reduce operating costs. A state machine controller is implemented by employing digital technology which enables greater accuracy in monitoring system performance and performing diagnostics. This control modality also provides greater tolerance of faults by permitting automatic reconfiguration of the control strategy so as to be independent of malfunctioning components.

13 Claims, 3 Drawing Sheets

STATE MACHINE CONTROLLER FOR OPERATING VARIABLE AIR VOLUME TERMINAL UNITS OF AN ENVIRONMENTAL CONTROL SYSTEM

FIELD OF THE INVENTION

This invention relates generally to environmental control systems for heating, ventilating and air conditioning applications; and more particularly, to apparatus for controlling elements of an environmental control system.

BACKGROUND OF THE INVENTION

Environmental control systems such as heating, ventilating and air conditioning (HVAC) systems are well known and are designed and implemented to maintain environmental conditions within buildings. A typical installation sees the building divided into zones, and the HVAC system is adapted to maintain each of the zones within predefined environmental parameters (e.g., temperature, humidity, outdoor-recirculated air ratio, etc.). In this exemplary installation, an air distribution system connects each of the zones with an air handling unit (AHU) for providing a supply of conditioned air to the particular zone. The AHU generally includes elements for introducing outdoor air into the system and for exhausting air from the system; elements for heating, cooling, filtering and otherwise conditioning the air in the zone, as well as elements for circulating the air within the zone's air distribution ducts at a desired flow rate.

Air flow from the air handling unit to each room within the zone is regulated by a separate variable air volume (VAV) terminal unit, also called a VAV box. The typical variable air volume terminal unit has a damper driven by an actuator to vary the flow of air from the zone's air distribution duct. The variable air volume terminal unit also may have a heating element to increase the temperature of the air that flows in to the associated room. The operation of the variable air volume terminal unit is provided by a VAV controller that must provide both continuous and discrete control functions. Continuous control includes a temperature loop and a flow loop, while discrete control includes the sequencing of the heating and cooling devices.

Most VAV controllers cannot perform adequate hybrid control. A pneumatic VAV controller can control a simple continuous loop, but cannot perform the discrete control. Analog electric and Direct Digital Control (DDC) controllers hold great promise, but often inherit the inadequate design concepts from their pneumatic predecessors. Existing VAV controllers often cycle between heating and cooling, which results in occupant discomfort, excessive energy usage, and premature equipment failure. The use of spring-ranging to sequence heating and cooling devices, a carryover from pneumatic controls, makes it difficult to identify the mode of operation, i.e., whether the controller was cooling, heating or other. Diagnostics for cooling and heating was difficult to implement correctly.

For example, FIG. 1 shows a flow chart for a prior art sequencing control strategy 10 which may be implemented in an HVAC system controller. Control strategy 10 is based on strategies used in pneumatic control systems. A single feedback controller 12, usually a proportional-integral (PI) controller, is used with this strategy, in conjunction with economizer logic 14 and low select logic 16, to reduce component costs. The controller output is determined by comparing the supply air temperature to a setpoint. If the scaled output from feedback controller 12 is between 100% and 200%, mechanical cooling via cooling coil 32 is used to cool the air. Here 100% represents no mechanical cooling and 200% represents maximum mechanical cooling. If the outdoor air conditions are suitable, an economizer cycle 14 (outdoor air dampers fully open) is used simultaneously to reduce the mechanical cooling load. If the output from feedback controller 12 is between −100% and 0%, heating coil 30 is used to heat the supply air and the outdoor air damper is at its minimum position determined by ventilation criteria. If the output from the feedback controller is between 0% and 100%, outdoor air and return air are mixed in mixed air plenum 14 to produce supply air at the setpoint temperature. This is referred to as free cooling because neither mechanical heating or cooling is used.

The dynamic characteristics of the three processes (i.e., heating, cooling, and free cooling) are significantly different, in which case the use of a single feedback controller is limiting. To maintain stable control, the controller must to be tuned for the worst case conditions. If this is the case, the closed loop response for other conditions will tend to be sluggish. If the feedback controller is not tuned for the worst case conditions, then valves and dampers of the system may cycle between fully open and fully closed with resultant energy waste and component wear.

The control performance can be improved by using an adaptive controller such as disclosed and described in commonly assigned U.S. Pat. Nos. 5,355,305, 5,506,768 and 5,568,377 the disclosures of which are hereby expressly incorporated herein by reference, to adjust the proportional gain and integral time of controller 12. However, the parameters may need significant adjustment as the control component changes, that is, as the control changes from cooling to heating. Also, it may be difficult to tune at the transition region because the combined process may be very nonlinear. During the time period that the adaptive controller is adjusting parameters at the transition region, the control performance may be sacrificed.

SUMMARY OF THE INVENTION

A general object of the present invention is to provide a controller for a heating, ventilating and air conditioning (HVAC) system which implements hybrid control, i.e. simultaneously continuous and discrete control.

Another object is to provide mode dependent diagnostic capability.

A further aspect of the present invention is to provide a HVAC system controller that is tolerant of faults in sensing components by adjusting the control strategy.

These and other objectives are satisfied by an apparatus for operating a system which regulates environmental conditions in a building. The system has sensors for sensing the environmental conditions, such as air flow and temperature, and having system elements such as air flow dampers and heaters, for altering the environmental conditions. The apparatus comprises a state machine controller having operational states which include plurality of automatic states in which the system elements are operated to alter the environmental conditions in response to the sensors. The operational states also include a plurality of command states in which operational parameters of the system are set. The state machine controller utilizes a memory to store data defining conditions for transition between the operational states wherein the state machine controller changes from one operational state to another in response to occurrence of conditions defined by the data.

A diagnostic element of the apparatus produces information about the performance of the system. The state machine controller enables the diagnostic element only when the state machine is operating in one of the automatic states.

DETAILED DESCRIPTION OF THE INVENTION

Figure 1:
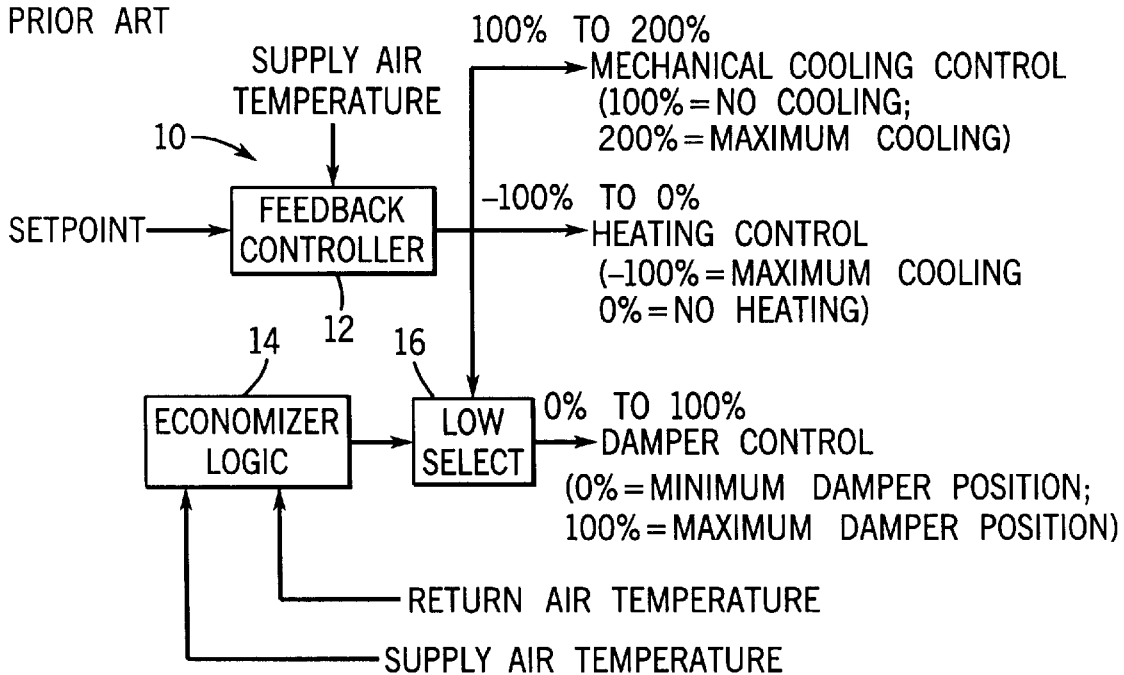
FIG. 1 is a block diagram illustrating a prior art pneumatic HVAC controller.
Figure 2:
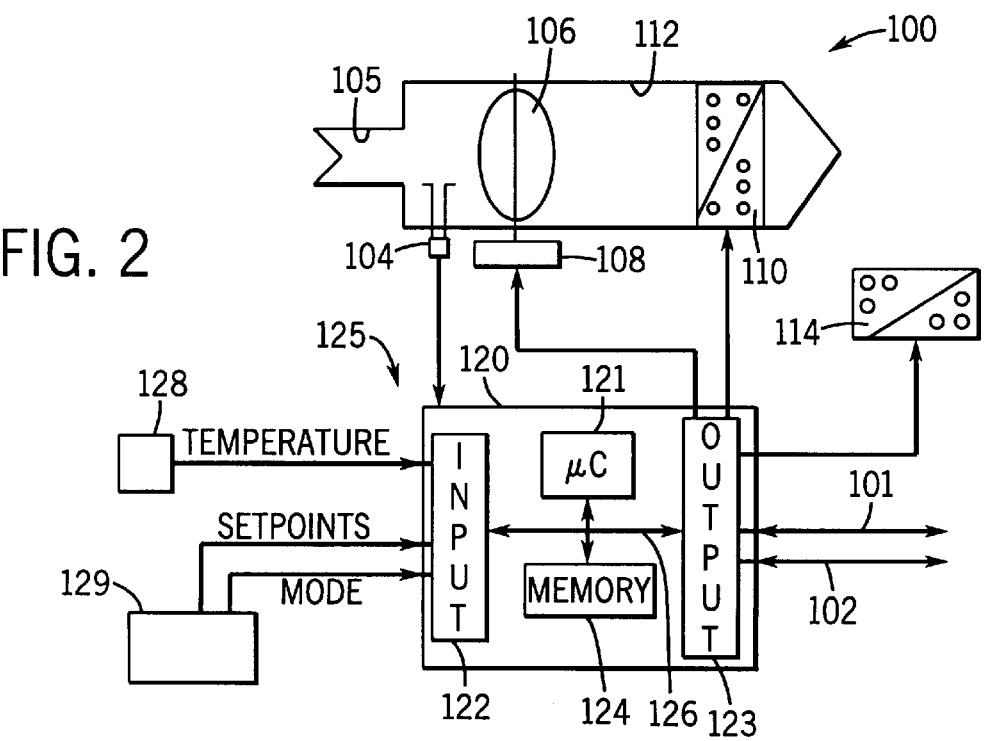
FIG. 2 is a block diagram illustrating a variable-air-volume (VAV) terminal unit and its controller adapted in accordance with the present invention.

With reference to FIG. 2, a variable-air-volume (VAV) terminal unit, or box, 100 is designed to maintain a relatively constant supply air temperature and deliver a variable amount of conditioned air into a controlled area of a building to maintain the area at a desired temperature. It will be appreciated that the invention has application to other implementations of variable-air-volume unit. VAV terminal unit 100 is preferably an electromechanical device with a digital controller 120. The VAV controller is designed to control the quantity and rate of thermal energy which the VAV terminal unit discharges into the zone to meet the thermal loads of the zone.

Having distributed digital control, VAV terminal unit 100 may operate in a standalone manner, or may be coupled to a global control system through a network arrangement such as the Metasys Network system available from Johnson Controls, Inc. of Milwaukee, Wis. When coupled to a network, VAV terminal unit 100 communicates using standard objects which reside within the VAV controller 120. In this manner, controller 120 may retain "point" information which may be retrieved and viewed by a user at any user interface on the network. Preferably VAV terminal unit 100 communicates through two ports 101 and 102, one for an N2 bus connection and one for an N3 bus, respectively, of the Metasys Network. Moreover, when coupled to the network, VAV terminal unit 100 is configurable through global tools with applications developed based upon standard objects, assembly objects and nested applications such provided in the Metasys Application Basic Programming Language available from Johnson Controls, Inc. Once the application is created using the global tools, it may be downloaded to VAV terminal unit 100 using an appropriate protocol such as BACnet.

The VAV terminal unit 100 has an inlet 105 connected to a duct through which a supply air stream flows from a conventional air handling unit. The supply air has a nominal temperature of approximately 55° F. (13° C.). An air flow sensor 104 provides supply air flow information, and damper 106 and damper actuator 108 act as a throttle for controlling the flow of supply air through VAV terminal unit 100. For example, if heating or cooling is not required, damper 106 may be adjusted to its minimum flow setting. Should heat be required, a box heat coil 110 is activated to warm the air flowing through chamber 112 and if a greater amount of heat is required a supplemental heat coil 114, such as baseboard heating or radiant panels, may be activated.

With continued reference to FIG. 2, VAV controller 120 according to the present invention includes a microcomputer 121, input circuits 122, output circuits 123 and a memory 124, all interconnected by a set of signal buses 126. The conventional microcomputer 121 contains a control program stored in a read only memory for implementing the control strategy that will be described herein. The input circuits 122 interface to input devices, such as parameter sensors, via inputs 125, and the output circuits 123 interface to actuators in the VAV terminal unit 100. For example, one of those inputs 125 is connected to a temperature sensor 128 in the zone, while another two inputs are connected to a user operable input device 129, such as a thermostat with a setpoint adjestment. Those latter inputs 125 receive setpoints that define a desired level for a given control parameter, for example the desired air flow rate or desired zone temperature. Separate setpoints for heating and cooling states of operation and for different time periods during the day can be defined. Memory 124 contains the control parameter data, such as the temperature and air flow setpoints and state transition data for implementing the control functions and state machine logic shown in FIGS. 3 and 4, respectively. Such data is employed by the controller 120 in determining the mode of operation based upon the current mode of operation, system performance data (i.e., flow rates and zone temperatures) and setpoints all shown generally as inputs 125.

The program executed by the microcomputer 121 can implement any suitable control strategy, and preferably, implements a proportional-integral-derivative (PID) feedback controller using the predictive adaptive control technology disclosed in the aforementioned commonly assigned United States patents.

Figure 3:
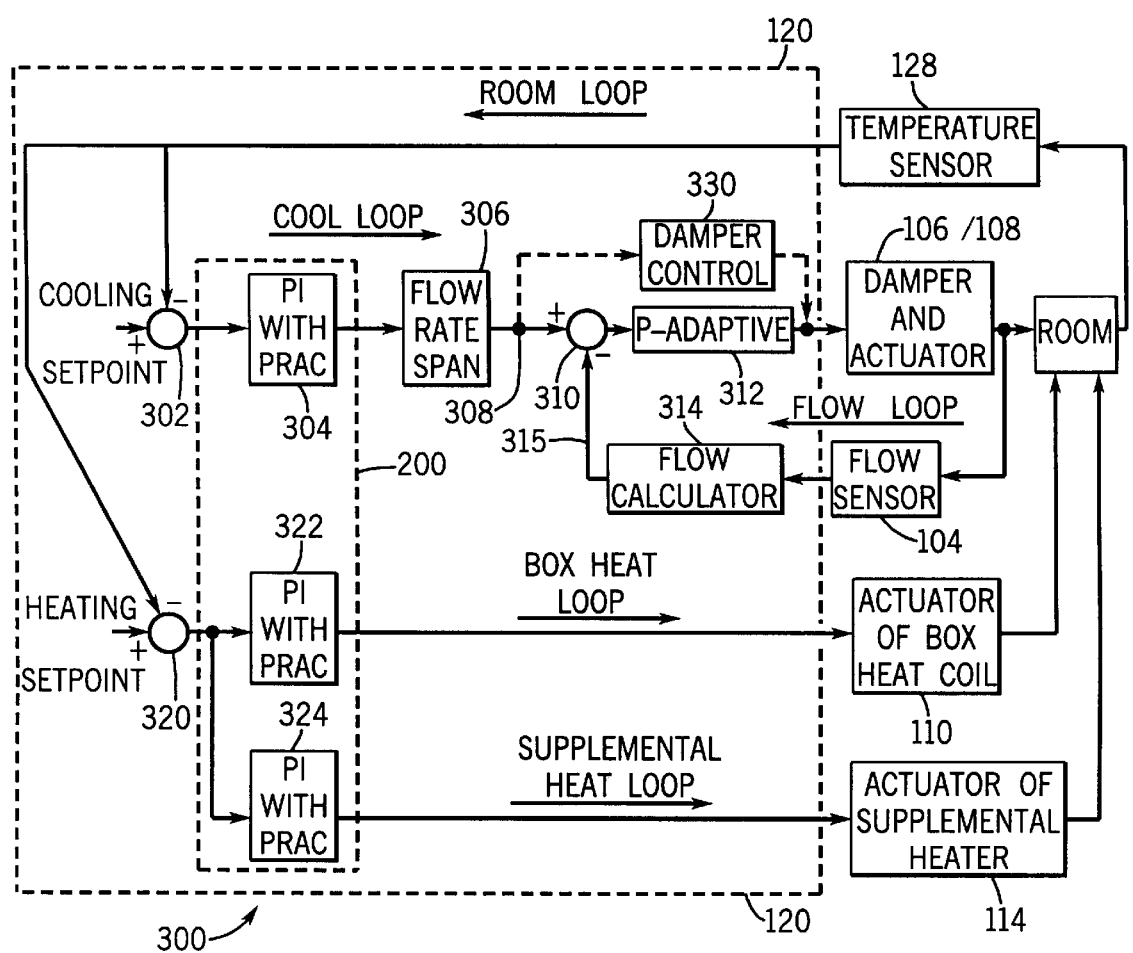
FIG. 3 is a block diagram of the control logic for the VAV terminal unit.
Figure 4:
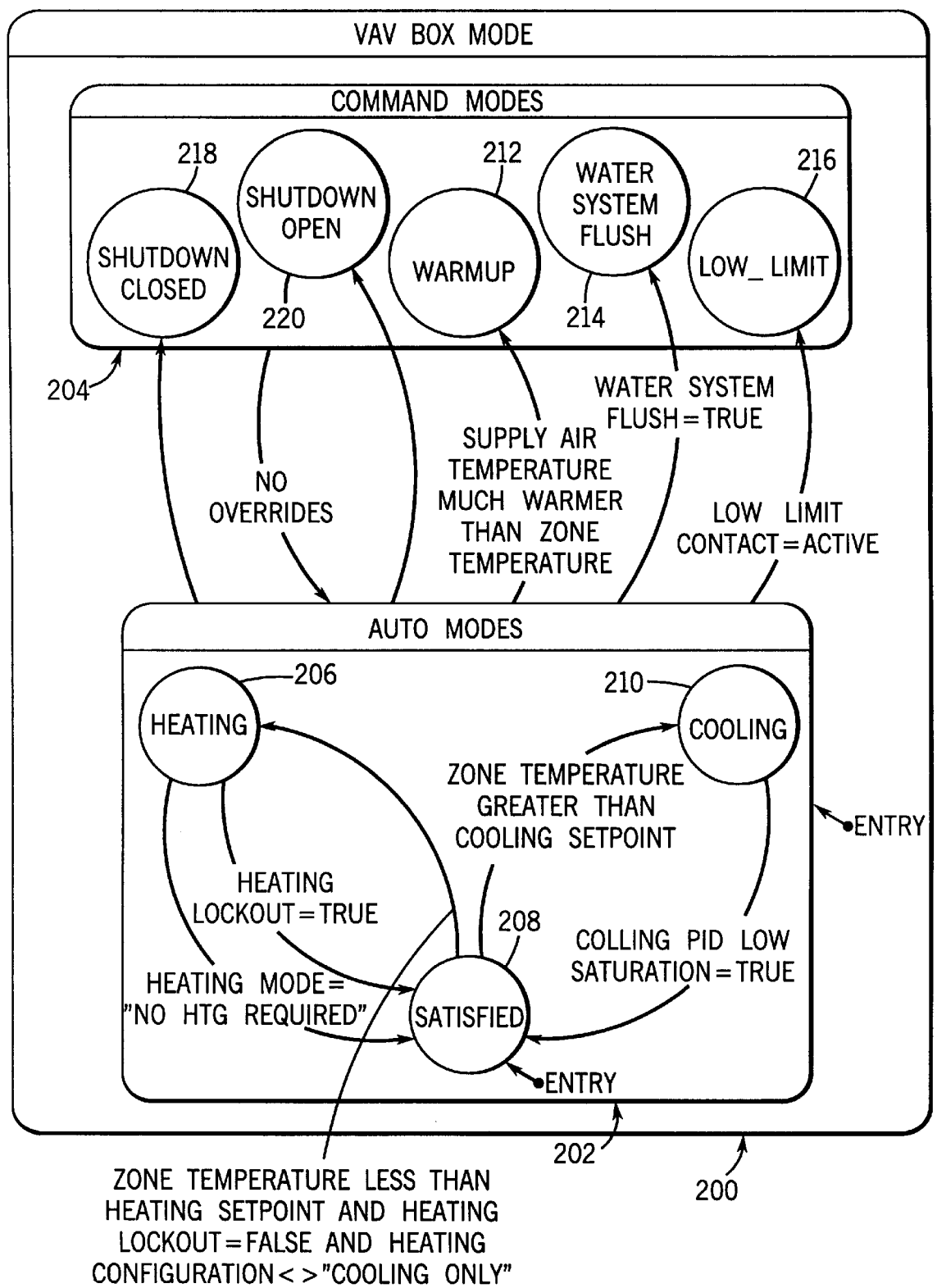
FIG. 4 is a state diagram for the VAV controller.

With reference to FIG. 3, the control logic 300 of the VAV terminal unit 100 comprises four loops, or processing branches, designated room loop, cool loop, box heat loop, and supplemental heat loop. The temperature sensor 128 produces a signal which is fed into the VAV controller 120 and is arithmetically combined with the cooling setpoint from memory 124 at summing node 302. The summing node 302 and other summing nodes in the control logic 300 are implemented by calculators programmed into the VAV controller 120. The cooling setpoint at summing node 302 is usually the actual cooling setpoint, but the actual heating setpoint is written to the summing node during warmup on VAV terminal units 100 with heating functions. On cooling only VAV terminal units, the cooling setpoint always is the actual cooling setpoint.

The resultant value at the output of summing node 302 is an error signal which is applied to a proportional-integral (PI) controller 304 with pattern recognition adaptive control (PRAC). The pattern recognition adaptive control algorithm tunes the proportional-integral feedback loops. PRAC automatically adjusts the proportional gain and integral time, as required to provide near optimal closed loop controller performance. PRAC automatically adjusts to different process noise levels, has minimal calculation and memory requirements, and is easily implemented. Using PRAC reduces commissioning time for new control systems, eliminates operator time for re-tuning control loops, and increases actuator life, since instability is eliminated. An example of this type of controller is given in the U.S. Pat. Nos. 5,355, 305 and 5,506,768 the description of which is incorporated herein by reference. The appropriate proportional-integral and pattern recognition adaptive control is enabled by a state machine, concurrently running in microcomputer 121, depending upon in which state the VAV controller 120 is operating.

The output of proportional-integral controller 304 is applied to a flow rate span circuit 306 which scales the output to the range of values for flow control. The resultant value at node 308 in which is the flow setpoint. The result of the summation produces a desired flow rate for the present state of operation. That desired flow rate is applied to another summing node 310 where it is combined with a signal indicative of the actual flow rate to produce a flow rate error signal which is applied to an input of a p-adaptive flow module 312. The p-adaptive flow module 312 is an incremental controller of the damper position, that is if its input has a positive value module 312 will produce a pulse that causes actuator 108 to open the damper 106 by an incremental amount. Correspondingly, if the signal to the p-adaptive flow controller is negative the output will produce an incremental closure of damper 106. The flow of air through the damper is sensed by flow sensor 104 to produce a flow indication signal. That signal applied to a flow calculator 314 to produce a measurement of the actual flow that is applied to node 310 as a feedback signal.

The output of temperature sensor 128 also is applied to a heat summing node 320 where it is combined with the heating setpoint to produce an indication of the error between the desired temperature as determined by the setpoint and the actual room temperature as measured by sensor 128. The output of this combination is applied to two heating proportional-integral controllers 322 and 324 with pattern recognition adaptive control which are similar to unit 304 described previously. The output of the box heat loop control 322 is applied to the actuator of the box heat coil 110. This actuator may be an electrical switch in the case of an electrical heat element or a valve of a hot water heating coil. The output of controller 324 is applied to the actuator of the supplemental heater 114.

When either the box heat proportional-integral controller 322 or the supplemental heat proportional-integral controller 324 is active, the heating setpoint at summing node 320, is equal to the actual heating setpoint; except during low limit state, when the heating setpoint is equal to the low limit temperature setpoint. The former setpoint is calculated, while the latter is a fixed value.

As noted above the proportional-integral controllers 304, 322 and 324, and thus the loops of the control process 300, are controlled by a state machine. The state machine, as depicted by the state diagram in FIG. 4, runs concurrently on the microcomputer 121 with the routines for implementing the system functions in FIG. 3. The different control states shown in the control state diagram 200 are divided into either automatic modes 202 or command modes 204. A command modes 204 is selected by the system user input, via a network interface 101–102 or directly through controller inputs 125. The automatic modes 202 are selected by the controller in response the occurrence of events defined by the transition data stored in memory 124.

Automatic Mode States

The VAV controller 120 usually operates in a closed-loop feedback configuration. The controller responds to dynamics of the HVAC control process and setpoint changes to meet the loads in the controlled space. This closed-loop mode of operation is described by a group of VAV mode states in the automatic classification 202 and comprise states designated heating 206, satisfied 208 and cooling 210. The controller automatically selects the state required to heat or cool the space, as necessary. In the cooling state 210, the VAV terminal unit 100 provides cool air to the space, if the zone temperature from the temperature sensor 128 is greater than the cooling zone temperature setpoint stored in memory 126.

If cooling is not required, the controller 100 is in the "satisfied" state 208. The present VAV unit mode is "satisfied" when the zone temperature is greater than the heating zone temperature setpoint and the zone temperature is less than the cooling zone temperature setpoint. The satisfied state 208 is defined by controls engineers as the state in which the process variable is within the deadband of the setpoint. The control function is satisfied when the zone temperature is within an acceptable range of the zone temperature setpoint. To a strict controls theorist, the zone can be satisfied in any form of heating, cooling or no action required. The usage of satisfied in this finite state machine controller 100 refers to the state between cooling and heating, and may be more appropriately referred to as "No Mechanical Cooling or Optional Mechanical Heating is Required."

The heating state 206 is part of the automatic mode 202, and refers to a situation in which heat is required, i.e., the zone temperature is less than the heating setpoint and there is one or more heating devices installed and available. The heating state 206 has multiple sub-states, corresponding to which heating devices are active and available. Three distinct heating modes are the box heat coil 110 (often referred to as "box reheat"), supplementary heating device 114 and box heating flow reset. The first two sub-states refer to the modulation of a heating device for a fixed flow, while the third heating type is the modulation of the flow across the box heating device.

If the configuration of the controller 100 is "Cooling Only" or if the Heating Lockout flag is true, then the state machine will not transition into heating. The Heating Lockout flag can be used to prevent the heating modes from being entered when heating devices are physically present but currently unavailable (e.g., the boiler is shut off for the summer).

The Flow Reset heating state allows the heating flow setpoint to increase after all types of heating selected have reached their maximum value. In certain situations, additional heating can be achieved by allowing an increase in the airflow across the heating coil. However, utilizing this feature significantly increases energy costs (due to reheating the cooler supply air and may cause unstable operation).

Command States

Within VAV Box Mode are command states 212–220 which are interlocked to hardware binary inputs or user overrides and allow the controller to exit the automatic portion 202 of VAV Box Mode 200 and enter a command mode 204 of operation. The principal states of the command mode include Warmup 212, Water System Flush 214, and Low Limit 216. In each of the command states the state machine holds the previous output of each proportional-integral controller 304, 322 and 324, thus terminating automatic control of the zone environment.

During the Low Limit state 216, the box heating device 110 is off, and the damper 106 is closed. If the zone temperature drops below the low limit temperature setpoint, the supplemental heat 114 is modulated to control zone temperature. This Low Limit mode state 216 is activated by the low limit contact. The low limit contact is a binary input to the controller 100 that typically is connected to a loading dock door contact or a window contact.

In the warmup mode 212, the air handling unit provides warm air through the VAV input 105 as needed to bring the system to normal occupied operating conditions. During warmup, supplemental heat is always enabled and the box heat is disabled, by default.

The water system flush state 214 typically is used during the startup and commissioning of a VAV controller 100 for the flushing, balancing, or maintenance of building heating water systems. Incremental, proportional, and two position-normally open and normally closed-heating outputs are affected by this feature. This logic does not control multiple stage heating outputs and is not activated for strategies using electric heat.

In the shutdown mode states 218 and 220, the damper 106 is commanded open during shutdown open mode 220 to satisfy the occupied cooling maximum air flow setpoint. During the shutdown closed mode 218, the damper 106 position is zero percent open. When either shutdown mode 218 or 220 is activated, all the analog and binary outputs of the controller 100 are turned off. However, in the other command modes 212 and 216 the controller outputs may be maintained, or held, at their last value set by an automatic mode 202 prior to transitioning into the command mode 204. The levels of air flow, heating or cooling are held constant while the controller 100 is in a command mode 204.

The VAV controller 100 simultaneously controls continuous and discrete control elements. Simultaneous heating and cooling is avoided by employing separate states for those functions. During operation, the controller's operating state is easily identifiable by users, whom can also select an operating mode. As a consequence of this state machine architecture, useful diagnostics such as moving averages for flow error and temperature error are also provided.

One of the benefits of the present state machine controller 100 is the ability to perform accurate and detailed diagnostics on the operation of the heating, ventilation and air conditioning system. When the controller 100 is in either of the heating or cooling states 206 or 210, the controller logic creates active Diagnostic Enable signals for temperature and flow. Diagnostics are disabled if the associated sensor (e.g. 128 or 104) goes unreliable, or if the respective control loop is in an open-loop configuration, such as in Shutdown Open or Shutdown Closed states.

When the temperature Diagnostic Enable signal is active, a comparison is made periodically between the temperature setpoint for that mode of operation and the temperature from the sensor 128. For example, every five seconds the difference between the actual temperature from the sensor 128 and the desired temperature for the zone, as indicated by the setpoint, is calculated by the controller 120 and stored as a zone temperature error in memory 124. Because the state machine implementation of the control strategy provides an accurate indication of the control mode state in which the VAV terminal unit 100 is operating, the controller unequivocally knows which temperature setpoint, for heating or cooling, to use in the error computation. This is unlike prior pneumatic based VAV controllers which could not accurately determine which mode of operation was being performed and thus which setpoint to use in determining a zone temperature error. Furthermore, the derivation of the zone temperature error is entirely digital based and recorded directly, whereas the pneumatic based controllers could not always calculate the error correctly. Such previous controllers did not always determine whether to use the heating or cooling setpoint in such calculation.

After a number of zone temperature errors have been stored within the controller memory 126, the accumulated data is used by a diagnostic element, such as a software routine, which evaluates the performance of the VAV terminal unit 100 and its control strategy. For example, the evaluation can be performed on a periodic basis, such as hourly, or whenever all of the storage locations in memory 124 which have been designated to contain the error data are filled. At that time, an evaluation routine can be executed within the controller 100 or all of the error data may be transmitted via the communication ports 101 and 102 to the global control system which monitors the HVAC operations of the entire building. In either case, the error data is evaluated in terms of the magnitude of the error and the arithimatic sign. For example, the reoccurrence of relatively large zone temperature errors, as determined by comparing the error to a given threshold, indicates that the VAV terminal unit 100 is cycling between the heating and cooling states 206 and 210. This type of error may indicate insufficient heating being provided by the VAV terminal unit. Alternatively, a large neagtive zone temperature error indicates the possibility of a blocked supply duct 105 or insufficient cooling being provided by the upstream air handling unit.

The results of this evaluation can be sent to the global system controller via the network ports 101 or 102 or fed directly to outputs of the VAV controller 120 that are provided to illuminate error indicators or trigger other types of alarms, thereby alerting building maintenance personnel. The receipt of similar data by the global control system from a number of adjoining VAV terminal units indicates a problem with their common air handling unit or ducts.

The present state machine implementation of a control strategy also provides a mechanism for accurately deriving flow air information based on the control mode state in which the VAV controller 120 is operating. Periodically, the air flow rate as determined by sensor 104 is compared to the setpoint flow rate specified for the active control state, cooling or heating. This flow error data is stored in another set of locations within the controller memory 126 and is evaluated occasionally in a manner similar to that for the zone temperature errors. The error is the flow setpoint value subtracted from the measured flow rate. For example, a relatively large positive flow rate error indicates that a significantly greater flow rate is needed in order to achieve the desired setpoint value. This may indicate that the HVAC system is not properly balanced to provide proper flow to all VAV terminal units, the duct work from the air handling unit is blocked, or that the damper 106 has not been opened properly. A significant negative flow error indicates that the flow greatly exceeds the desired setpoint level and may indicate that the damper 106 is stuck in the open position. The VAV controller 100 may forward this information to the global control system for the building which then produces an error signal to building maintenance personnel or in the alternative the VAV controller 100 may directly produce a warning indication that maintenance is required. By implementing the control strategy using state machine architecture, greater accuracy in obtaining and interpreting the flow error data can be achieved than was possible with pneumatic-based control technology.

When the state machine is in cooling state 210 only the cool loop of the control process 300 is active. Specifically, only proportional-integral controller 304 is activated by the state machine. When the state machine 200 is in the heating state 206, the VAV controller 120 places the cooling loop proportional-integral controller 304 in a predefined state which produces a fixed predetermined air flow rate through damper 106 of the VAV terminal unit 100. At the same time, the substates of the heating state 206 activate one or the other on the two heating loop proportional-integral controllers 322 or 324. Initially only the box heat control loop proportional-integral controller 220 is active so that the primary heating is produced by the box heat coil 110. If a relatively large amount of heating is required the proportional-integral controller 322 will soon reach its maximum value or 100% activation of the box heat coil 110. When proportional-integral controller 322 for the box heat loop is operating at 100% output continuously for a given period of time, the heating state 206 makes a transition to another substate at which the output of that box heat loop is fixed at 100% and the proportional-integral controller 324 for the supplemental heat loop is activated so that the supplemental heater 114 will provide additional heat to the room. In some installations, the supplemental heater 114 may be more efficient than the box heat coil 110 and thus be the primary heating element which is activated first and the box heat coil is only activated when the supplemental heater is operating at 100% capacity. For example, the box heat coil may be an electric heater which is relatively expensive to operate, whereas the supplemental heater 114 is a conventional baseboard radiator which is relatively economical.

One of the advantages of the present state machine implementation of a VAV controller 120 is the ability to be relatively tolerant to sensor faults. For example, in previous VAV control systems when the flow sensor 104 became inoperative, the control strategy was to fix the position of the damper 106 thus eliminating all dynamic control of the air flow. This is in contrast to the present VAV controller 120 which is able to detect a bad sensor and to modify its control strategy from a flow feedback to a feed forward approach.

Specifically, the VAV controller 120 is able to monitor the input signal from the flow sensor 104 and detect when it is out of range thus indicating a malfunctioning sensor. The sensor function is monitored by a diagnostic element which is implemented by the controllers 121–124 periodically executing a routine.

A typical sensor may produce an output signal having a maximum voltage range of 0–5 volts with the typical operating range being well within those extremes. Therefore, a sensor signal at one of those extremes is an unusual condition, typically indicative of either a short or open sensor circuit. When the VAV controller 120 detects an input signal from the flow sensor 104 at one of the voltage range extremes, the controller concludes that the sensor is malfunctioning and terminates the feedback loop control provided by that sensor. Specifically, the output of the p-adaptive flow module 312 is terminated by opening its output terminal. At the same time, a damper control element 330 is placed into the cool loop between the output of flow rate span circuit 306 and the output of the controller 120 that is connected to the damper actuator 108. This new signal path is indicated by the dashed line in FIG. 3. The damper control element 330 produces an output according to the following expression:

$$\text{POSITION} = \left(\frac{\text{FLOW SETPOINT}}{\text{MAX AIR FLOW}}\right) \times 100$$

The POSITION of the damper as a percentage of the open position, limited between 0% and 100%, inclusive.

In this feed forward mode, the controller 120 continues to monitor the signal from the flow sensor and if it is determined to be valid, that is it no longer has a level at one of the voltage range extremes, the flow feedback loop 315 will be reinstated and the damper control element 330 removed from the circuit.

We claim:

1. An apparatus for operating a system which regulates environmental conditions in a building, the system having sensors for sensing the environmental conditions and having system elements for altering the environmental conditions, the apparatus comprising:

a state machine controller having operational states comprising a plurality of automatic states in which the system elements are operated to alter the environmental conditions in response to the sensors and a plurality of command states in which operating parameters of the system are predefined, the state machine controller including a memory which contains data defining conditions for transition between the operational states wherein the state machine controller changes from one operational state to another in response to occurrence of conditions defined by the data; and a diagnostic element for producing information regarding performance of the system wherein the state machine controller enables the diagnostic element only when the state machine controller is operating in one of the automatic states.

2. The apparatus as recited in claim 1 wherein the system has a variable damper which controls flow of air into a section of the building and has a heater for that section and wherein one of the plurality of automatic states is a cooling state in which the state machine varies a position of the damper, and one of the plurality of automatic states is a heating state in which the state machine varies a position of the damper and the heater.

3. The apparatus as recited in claim 1 wherein the diagnostic element produces the information in response to the environmental conditions sensed by the sensors.

4. The apparatus as recited in claim 1 wherein the diagnostic element comprises a calculator which determines a difference between a temperature measurement produced by one of the sensors and a desired temperature level.

5. The apparatus as recited in claim 4 wherein the diagnostic element issues a warning signal when the difference exceeds a predefined value.

6. The apparatus as recited in claim 1 wherein the diagnostic element comprises a calculator which determines a difference between an air flow measurement produced by one of the sensors and a desired air flow level.

7. The apparatus as recited in claim 6 wherein the diagnostic element issues a warning signal when the difference exceeds a predefined value.

8. The apparatus as recited in claim 1 wherein at any point in time the state machine controller may operate in only one of the operating states.

9. An apparatus for operating a system which regulates environmental conditions in a building, the system having sensors for sensing the environmental conditions and having system elements for altering the environmental conditions, the apparatus comprising:

a state machine controller connected to operate the system elements, and having operational states comprising a plurality of automatic states in which the system elements are operated to alter the environmental conditions in response to the sensors and a plurality of command states in which operating parameters of the system are predefined, the state machine controller including a memory which contains data defining conditions for transition between the operational states wherein the state machine controller changes from one operational state to another in response to occurrence of conditions defined by the data; and a diagnostic element which detects when one of the sensors has malfunctioned, wherein the state machine controller enables the diagnostic element only when the state machine controller is operating in one of the automatic states;

wherein the state machine responds to the diagnostic element by altering operation of the system elements when one of the sensors has malfunctioned.

10. The apparatus as recited in claim 9 wherein one of the sensors is an air flow sensor and one of the system elements is a variable damper; and the state machine controller has a control element which operates the variable damper in response to a comparison of a signal from the air flow sensor to a desired air flow level in absence of the diagnostic element detecting that the air flow sensor has malfunctioned.

11. The apparatus as recited in claim 10 wherein the control element of the state machine controller operates the variable damper in response to the desired air flow level and ignores the signal from the air flow sensor, when the diagnostic element detects that the air flow sensor has malfunctioned.

12. The apparatus as recited in claim 11 wherein when the diagnostic element detects that the air flow sensor has malfunctioned, the control element operates the variable damper according to the expression:

$$\text{POSITION} = \left(\frac{\text{FLOW SETPOINT}}{\text{MAX AIR FLOW}}\right) \times 100$$

where POSITION indicates a position for the damper, FLOW SETPOINT is the desired air flow level and MAX AIR FLOW is the maximum level of air flow provided by the system.

13. The apparatus as recited in claim 10 wherein when the diagnostic element detects that a given sensor has malfunctioned, the state machine controller operates the system elements to control the environmental conditions without regard to the environmental condition sensed by that given sensor.

* * * * *